(12) United States Patent
Duarte et al.

(10) Patent No.: US 6,888,862 B2
(45) Date of Patent: *May 3, 2005

(54) DYE-DOPED POLYMER NANOPARTICLE GAIN MEDIUM

(75) Inventors: Francisco J. Duarte, Rochester, NY (US); Robert O. James, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 81 days.

This patent is subject to a terminal disclaimer.

(21) Appl. No.: 10/457,634

(22) Filed: Jun. 9, 2003

(65) Prior Publication Data

US 2004/0120374 A1 Jun. 24, 2004

Related U.S. Application Data

(63) Continuation-in-part of application No. 10/325,549, filed on Dec. 20, 2002.

(51) Int. Cl.[7] .................................................. H01S 3/14
(52) U.S. Cl. .................................................. 372/39
(58) Field of Search ............................ 372/39; 359/343, 359/341, 326

(56) References Cited

U.S. PATENT DOCUMENTS

| | | | |
|---|---|---|---|
| 4,139,342 A | * 2/1979 | Sheldrake et al. ............. | 8/509 |
| 4,891,817 A | 1/1990 | Duarte | |
| 5,181,222 A | 1/1993 | Duarte | |
| 5,985,173 A | 11/1999 | Gray et al. | |
| 6,441,077 B1 | 8/2002 | Border et al. | |
| 6,548,264 B1 | * 4/2003 | Tan et al. ................... | 435/7.21 |
| 6,597,496 B1 | * 7/2003 | Nayfeh et al. .............. | 359/343 |
| 6,654,161 B2 | * 11/2003 | Bass et al. .................. | 359/326 |
| 2003/0202770 A1 | * 10/2003 | Garito et al. ............... | 385/141 |
| 2003/0234978 A1 | * 12/2003 | Garito et al. ............ | 359/341.5 |

OTHER PUBLICATIONS

"Efficient tunable solid–state laser near 630 nm using sulforhodamine 640–dopes silica gel" by F. Salin, G. Le Saux, P. Georges, and A. Brun, Aug. 1, 1989/vol. 14, No. 15/Optics Letters, pp. 785–787.

"A New Tunable Dyle Laser Oscillator: Preliminary Report" by F.J. Duarte, J.J. Ehrlich, W.E. Davenport, T.S. Taylor, J.C. McDonald, Proceedings of the International Conference on Lasers, Dec. 7–10, 1992. C.P. Wang, Editor, STS Press, McLean, VA, 1993, pp. 293–296.

"Solid–State Laser Using a Rhodamine–Doped silica Gel Compound", J.C. Altman, R.E. Stone, B. Dunn, and F. Nishida, IEEE Photonics Technology Letters, vol. 3, No. 3, Mar. 1991, pp. 189–190.

"Solid–state dispersive dye laser oscillator:very compact cavity", F.J. Duarte, Optics Communications 117 (1995), pp. 480–484.

"Stimulated Emission from Flashlamp–Excited Organic Dyes in Polymethyl Methacrylate", O.G.Peterson and B.B. Snavely, Applied Physics Letters, vol. 12, No. 7, Apr. 1, 1968, pp. 238–239.

"Continuously Tunable, Narrow–band Organic Dye Lasers" B.H. Soffer & B.B. McFarland, Applied Physics Letters, vol. 10, No. 10, May 15, 1967, pp. 266–267.

(Continued)

*Primary Examiner*—Wilson Lee
*Assistant Examiner*—Hung Tran Vy
(74) *Attorney, Agent, or Firm*—Susan L. Parulski

(57) ABSTRACT

A gain medium for producing a light emission in a laser. The gain medium comprises a dye-doped polymer nanoparticle matrix having an absolute value of dn/dT less than an absolute value of dn/dT of its dye-doped polymer matrix.

12 Claims, 15 Drawing Sheets-

OTHER PUBLICATIONS

"Solid–state dye laser wtih modified poly(methyl methacrylate)–doped active elements", A. Maslyukov, s. Sokolov, M. Kaivola, K. Nyholm, and S. Popov, Applied Optics/ vol. 34, No. 9/Mar. 20, 1995, pp. 1516–1518.

"Solid–state multiple–prism grating dye–laser oscillators", F.J. Duarte, Applied Optics, vol. 33, No. 18, Jun. 20, 1994, pp. 3857–3860.

"Optical Inhomogeneties in Sol–gel Derived Ormosils and Nanocomposites", F.J. Duarte, E.J. A. Pope, Sol–Gel Science and Technology, Ceramic Transactions, vol. 55, pp. 267–273.

(Book)—"High Power Dye Lasers", F. J. Duarte, P.N. Everett, C. Jensen, C.R. Tallman, R.A. Tennant, C.E. Webb, (Springer–Verlag, Berlin, 1991).

(Book) Dye Laser Principles, M.A. Akerman, J.C. Diels, F.J. Duarte, L. Goldman, L.W. Hillman, L. Hollberg, G. Jones, D. Klick, F.J. Duarte & L. W. Hillman (Eds), Academic, NY 1990.

Polymeric Matrices for Lasing Dyes: Recent Developments, Costela, et al, Laser Chem 18, pp. 63–84.

"Compact Narrow Linewidth Dolid STate Dye Lasers", F. Duarte, Proceedings of the International Conference on Lasers, '95, pp. 329–344.

Transparent silica gel–PMMA composites, E.J.a. Pope, M. Asami, and J.D. Mackenzie, J. Mater.Res., vol. 4, No. 4, Jul/Aug. 1989 Materials Research Society.

"Solid–state Dye Laser Oscillators", F.J. Duarte, Proceedings of the International Conference on Lasers '93, pp. 400–404.

"Opportunity beckons for solid–state dye lasers", F.J. Duarte, Laser Focus World, May 1995.

F.J. Duarte, L.W. Hillman, *Dye Laser Principles with Applications*, Laser Dynamics, Chapter 2, 1990, pp. 16–39.

F.J. Duarte, *Narrow–Linewidth Pulsed Dye Laser Oscillators*, Photographic Research Laboratories, Eastman Kodak Company, Chapter 4, 1990, pp. 133–285.

B.H. Soffer and B.B. McFarland, *Continuously Tunable, Narrow–Band Organic Dye Lasers*, Applied Physics Letters, May 15, 1967, vol. 10, No. 10, pp. 266–267.

A. Costela, I. Garcia–Moreno, R. Sastre, *Polymeric Solid––State Dye Lasers : Recent Developments*, PCCP, Invited Article, Phys. Chem. Phys., 2003, 5, pp. 4745–4763.

F.J. Duarte and R.O. James, *Tunable solid–state incorporating dye–doped, polymer–nanoparticle gain media*, Optics Letter, vol. 28, No. 21/Nov. 1, 2003, pp. 2088–2090.

F.J. Duarte and R.O. James, *Spatial structure of dye–doped polymer nanoparticle laser media*, Applied Optics, vol. 43, No. 20, Jul. 10, 2004, pp. 4088–4090.

* cited by examiner

AVERAGE PHYSICAL PROPERITES OF PLEXIGLAS® V-SERIES MOLDING RESINS
PLEXIGLAS® VLD

| PROPERTY | TEST METHOD | PLEXIGLAS® VLD |
|---|---|---|
| REFRACTIVE INDEX | ASTM D-542 | 1.49 |
| SPECIFIC GRAVITY | ASTM D-792 | 1.19 |
| MELT FLOW RATE | ASTM D-1238 g/10MIN. CONDITION 1 | 22 |
| LIGHT TRANSMISSION | ASTM D-1003 TOTAL WHITE LIGHT | 91 |
| HAZE | % | < 1 |
| ROCKWELL HARDNESS | ASTM D-785 M SCALE | 94 |
| TENSILE STRENGTH | ASTM D-638(d) (0.1"/IN/MIN) INIT. STRAIN RATE, MAX. PSI | 8,600 |
| FLEXURAL STRENGTH | ASTM D-790(d) SPAN-DEPTH RATIO 16 (0.1in./min.) max. psi | 12,000 |
| FLEXURAL MODULUS | PSI | 440,000 |
| IMPACT STRENGTH | ASTM D-256(d) IZOD MILLED NOTCH, ft.lb./in OF NOTCH | 0.23 |
| | FALLING DART (6"X6"X1/8", 3 LB DART, 1/4" RADIUIS)ft. lbs. | 1 |
| DEFLECTION TEMP. UNDER LOAD, ANNEALED (e) | ASTM D-648 3.6°F/min, 264PSI | 190 |
| VICAT SOFTENING POINT | ASTM D-1525 UNANNEALED, 90°F/HR. 2.2LBS | 207 |

FIG. 7

| NEW D05903 DUARTE, JAMES & ROWLEY | TUNABLE DYE LASER COMPOSITION | | | | NOVEMBER 27/2002 | | |
|---|---|---|---|---|---|---|---|
| | MASS(g) | FRACTION | %W/W SOLID (G) | %SOLIDS | VOLATILES | SOLVENT | |
| STOCK SOL'NS | | | | | | | |
| MEK-ST, SILICA SOL (NISSAN CHEMICAL) | 150 | 0.305 | 30.5 | 45.750 | 104.25 | MEK | |
| PMMA IN MEK (VLD-100) | 355 | 0.3 | 30 | 106.500 | 248.50 | MEK | |
| PMMA IN MeCl2 | 0 | 0.3 | 30 | 0.000 | 0.00 | MeCl2 | |
| RHODAMINE 6G SOL IN MeCl2 | 100 | 0.001 | 0.1 | 0.100 | 99.90 | MeCl2 | |
| TOTAL | 605 | | | 152.350 | 452.65 | 25.18 | SOLVENT BLEND %MeCl2 22.07003 %MEK 77.92997 |
| %SiO2 | | | | 30.030 | w/w | | |
| %PMMA | | | | 69.905 | w/w | | |
| %R-6G | | | | 0.066 | w/w | | |
| | | | SUM% | 100.000 | | | |

SAMPLE OF THE STABLE DISPERSION WERE CAST INTO 100ml POLYOLEFIN CONTAINERS AND THE SOLVENT WAS SLOWLY EVAPORATED AT 23 DEG C

*FIG. 12*

NEW D05904  TUNABLE DYE LASER COMPOSITION  NOVEMBER 27/2002
DUARTE, JAMES & ROWLEY

| STOCK SOL'NS | MASS(g) | FRACTION | %W/W | SOLID (G) | %SOLIDS | VOLATILES | SOLVENT |
|---|---|---|---|---|---|---|---|
| MEK-ST, SILICA SOL (NISSAN CHEMICAL) | 200 | 0.305 | 30.5 | 61.000 | | 139.00 | MEK |
| PMMA IN MEK (VLD-100) | 302 | 0.3 | 30 | 90.600 | | 211.40 | MEK |
| PMMA IN MeCl2 | 0 | 0.3 | 30 | 0.000 | | 0.00 | MeCl2 |
| RHODAMINE 6G SOL IN MeCl2 | 100 | 0.001 | 0.1 | 0.100 | | 99.90 | MeCl2 |
| TOTAL | 602 | | | 151.700 | 25.20 | 450.30 | SOLVENT BLEND %MeCl2 22.18521 %MEK 77.81479 |

%SiO2    40.211   w/w
%PMMA    59.723   w/w
%R-6G     0.066   w/w
SUM%    100.000

SAMPLE OF THE STABLE DISPERSION WERE CAST INTO 100ml POLYOLEFIN
CONTAINERS AND THE SOLVENT WAS SLOWLY EVAPORATED AT 23 DEG C

*FIG. 13*

NEW D05905          TUNABLE DYE LASER COMPOSITION          NOVEMBER 27/2002
DUARTE, JAMES & ROWLEY

| STOCK SOL'NS | MASS(g) | FRACTION | %w/w | SOLID (g) | %SOLIDS | VOLATILES | SOLVENT |
|---|---|---|---|---|---|---|---|
| MEK-ST, SILICA SOL (NISSAN CHEMICAL) | 246 | 0.305 | 30.5 | 75.030 | | 170.97 | MEK |
| PMMA IN MEK (VLD-100) | 250 | 0.3 | 30 | 75.000 | | 175.00 | MEK |
| PMMA IN MeCl2 | 0 | 0.3 | 30 | 0.000 | | 0.00 | MeCl2 |
| RHODAMINE 6G SOL IN MeCl2 | 100 | 0.001 | 0.1 | 0.100 | | 99.90 | MeCl2 |
| TOTAL | 596 | | | 150.130 | 25.19 | 445.87 | SOLVENT BLEND %MeCl2 22.40563 %MEK 77.59437 |

%SiO2     49.977   w/w
%PMMA    49.957   w/w
%R-6G     0.067   w/w
SUM%    100.000

SAMPLE OF THE STABLE DISPERSION WERE CAST INTO 100ml POLYOLEFIN
CONTAINERS AND THE SOLVENT WAS SLOWLY EVAPORATED AT 23 DEG C

*FIG. 14*

PERFORMANCE OF SOLID-STATE LASERS INCORPORATING
DDP AND DDPN GAIN MATRICES

| GAIN MATRIX | $\lambda_a$ (nm) | TUNING RANGE (nm) | $\Delta\Theta$ (mrad) |
|---|---|---|---|
| DDP | ~525 | 563–610 | 2.3 |
| DDPN AT 30% w/w SiO$_2$ | ~525 | 567–603 | 1.9 |
| DDPN AT 50% w/w SiO$_2$ | ~550 | 570–600 | 1.6 |

FIG. 19

$\partial n/\partial T$ IN DDP AND DDPN MATRICIES

| MATRIX[a] | $\lambda$(nm) | $\partial n/\partial T$ |
|---|---|---|
| DDP[b] | 594 | $-1.4\pm0.2\times10^{-4}$ |
| PN AT 0% w/w SiO$_2$ | 632.8 | $-1.0317\times10^{-4}$ |
| PN AT 30% w/w SiO$_2$ | 632.8 | $-0.8840\times10^{-4}$ |
| PN AT 50% w/w SiO$_2$ | 632.8 | $-0.6484\times10^{-4}$ |

[a] P STANDS FOR THE PMMA POLYMER

FIG. 20

DYE-DOPED POLYMER NANOPARTICLE GAIN MEDIUM

CROSS REFERENCE TO RELATED APPLICATION

This is a Continuation-in-Part of U.S. Ser. No. 10/325,549 entitled "DYE-DOPED POLYMER NANOPARTICLE GAIN MEDIUM FOR USE IN A LASER", filed on Dec. 20, 2002 in the names of Duarte et al, and which is assigned to the assignee of this application.

FIELD OF THE INVENTION

The invention relates generally to the field of lasers, and in particular to tunable dye lasers. More specifically, the invention relates to a solid-state gain medium of a tunable laser.

BACKGROUND OF THE INVENTION

Lasers are well known devices employed as a light source, and have been shown to emit light throughout the visible spectrum at very narrow linewidths. Tunable dye lasers are well known and are widely applied in many fields.

Such tunable lasers employ means to "tune" the laser to emit light at differing wavelengths. Such tunable dye lasers can use a liquid gain media, such as disclosed in U.S. Pat. No. 5,181,222 (Duarte), commonly assigned and incorporated herein by reference. FIG. 1 shows a schematic diagram of a dye laser apparatus 20 disclosed in U.S. Pat. No. 5,181,222. As illustrated, apparatus 20 includes a narrow linewidth laser output beam indicated at 22 by parallel dashed lines. The diameter of beam 22 is indicated at W. A dye cell 24 (which can be like the one described in U.S. Pat. No. 4,891,817) is "pumped" or excited by a beam 26 from a source such as a copper laser. This phenomenon is well known in the art. The pulse repetition frequency (prf) of such a source is in the range from 5 kHz to 20 kHz. Other laser pump sources, such as the $N_2$ laser, deliver pulse repetition frequencies in the 1 Hz–100 Hz range. Forming part of an optical cavity of the laser apparatus 20 is a first prism 30 which receives laser emission from dye cell 24 at an incident angle indicated at $\phi1,1$. Laser light (indicated by the shaded area) from prism 30 is directed at an angle $\phi1,2$ onto a second prism 32 and thence is refracted at an angle $\psi1,2$ in an expanded beam (shaded area) onto a Littrow-mounted grating 34. The angle of light incident on and diffracted from grating 34 is indicated by an angle $\theta$. The relationships of these angles to the laser beams within the multiple-prism Littrow-mounted grating (MPL) portions of the optical cavity are given in detail in a book entitled DYE LASER PRINCIPLES by Duarte, an inventor of the present invention. After being diffracted back from Littrow-mounted grating 34, through prism 32 and prism 30, the laser light is highly polarized and frequency narrowed. The plane of polarization here lies parallel to the plane of FIG. 1. This polarized light passes to the left back through dye cell 24 for further amplification and becomes a narrow linewidth laser beam 38 having the diameter W. As the polarized beam 38 continues to the left from dye cell 24, it encounters a specially provided, partially reflecting polarizer device 40. The outer or left-most face of polarizer device 40 is made partially reflecting by a suitable coating 42, such as a very thin layer of low-loss dielectric material, which gives about 5% to 20% reflection of laser beam 38. The remaining 80% to 95% of beam 38 passes through reflecting coating 42 and becomes laser output beam 22. Laser beam 22 is polarized in a plane parallel to the plane of FIG. 1.

There are several disadvantages to such dye lasers. The lasers can employ ethanol and methanol solvents, and therefore can be a safety concern. Further, such dye lasers are not compact, and compactness is needed in some applications.

Solid state dye lasers were introduced in the 1960s. (Refer to Soffer and McFarland, CONTINUOUSLY TUNABLE NARROW-BAND ORGANIC DYE LASER, Appl. Phys. Lett. 10, 266–267 (1967), and Peterson and Snavely, STIMULATED EMISSION FROM FLASHLAMP-EXCITED ORGANIC DYES IN POLYMETHYL METHACRYLATE, Appl. Phy. Lett. 12, 238–240, (1968).) The gain media employed by these early solid state dye lasers was dye-doped PMMA (polymethyl methacrylate). The early PMMA was plagued by inhomogenities which severely limited their scope. As such, developments in this area were not pursued until the early 1990s when researchers developed a highly homogeneous from of dye-doped PMMA, which they referred to as MPMMA (modified polymethyl methacrylate). (Refer to Maslyukov et al, SOLID-STATE DYE LASER WITH MODIFIED POLY (METHYL METHACRYLATE)-DOPED ACTIVE ELEMENTS, Appl. Opt. 34, 1516–1518, 1995.)

A very narrow linewidth tunable emission laser was developed using the dye-doped MPMMA in the mid-1990s by one of the inventors of the present invention. (Refer to Duarte, SOLID-STATE MULTIPLE-PRISM GRATING DYE LASER OSCILATORS, Appl. Opt. 33, 3857–3869 (1994), and Duarte, SOLID-STATE DISPERSIVE DYE LASER OSCILLATOR: VERY COMPACT CAVITY, Opt. Commun. 117, 480–484 (1995).) However, a disadvantage of the MPMMA and other types of dye-doped polymers, such as HEMA:MMA (referred to in Costela et al, POLYMERIC MATRICES FOR LASING DYES: RECENT DEVELOPMENTS, Laser Chem. 18, 63–84.), is a high dn/dT value, wherein n is the refractive index and T is the temperature. In pure dye-doped polymer matrices, dn/dT is in the range of about $-1.2\times10^{-4}$ to about $-1.4\times10^{-4}$(degree-K)$^{-1}$. A high dn/dT value prevents operation of the laser at high repetition rates and higher pulsed energies. For instance, the use of high repetition rates causes increased beam divergence and other undesirable features such as a loss of spectral coherence.

In the late 1980s and early 1990s, sol gels and other polymer silicate composites were introduced for addressing thermal issues. (Refer to Duarte et al, A NEW TUNABLE DYE LASER OSCILLATOR: PRELIMARY REPORT, in Proceedings of the International Conference on Lasers '92, Wang, Ed. (STS, McLean, Va., 1993) pp 293–296, and Salin et al, Opt. Lett. 14, 785 (1989), and Altman et al, IEEE Photon. Technol. Lett. 3, 189 (1991).) Unfortunately, these sol gels exhibited internal optical inhomogenities that manifested via severe laser beam distortions, as shown in FIG. 2.

Accordingly, a need exists for a gain media that exhibits optical homogeneity and has a low dn/dT value.

The present invention provides an optically homogeneous gain media material. The material is easy to manufacture, low in cost, can be polished to form facets, maintain stable performance characteristics over a broad temperature range, and provides for reduced laser beam divergence.

SUMMARY OF THE INVENTION

An object of the present invention is to provide an optically homogeneous gain media material.

Another object of the present invention is to provide such a material which is easy to manufacture.

A further object of the present invention is to provide such a material which is low in cost.

Yet a further object of the present invention is to provide such a material which can be can be polished to form optical facets.

Still yet another object of the present invention is to provide such a material which maintains stable performance characteristics over a broad temperature range.

A still further object of the present invention is to provide such a material which provides reduced laser beam divergence.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a gain medium for producing a light emission in a laser. The gain medium comprises a dye-doped polymer nanoparticle matrix comprised of dye-doped polymers and nanoparticles. The dye-doped polymer nanoparticle matrix has an absolute value of dn/dT less than an absolute value of dn/dT of the pure dye-doped polymer matrix.

According to one aspect of the invention, there is provided a laser having a gain medium producing a light emission. The gain medium comprises a dye-doped polymer nanoparticle matrix that enables the emission of single transverse mode laser beam. The gain medium comprises a dye-doped polymer nanoparticle matrix having an absolute value of dn/dT less than an absolute value of dn/dT of its dye-doped polymer matrix.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 7 shows a chart listing particular material properties of PLEXIGLAS® VLD available from Atoglas.

FIG. 12 shows a composition of a Rhodamine-doped PMMA-silica matrix having 30 percent w/w silica.

FIG. 13 shows a composition of a Rhodamine-doped PMMA-silica matrix having 40 percent w/w silica.

FIG. 14 shows a composition of a Rhodamine-doped PMMA-silica matrix having 50 percent w/w silica.

FIG. 19 shows the performance of solid-state lasers incorporating dye-doped polymers and dye-doped polymer nanoparticles indicating reduced laser beam divergence.

FIG. 20 shows a comparison of dn/dT values for the materials of FIG. 19.

DETAILED DESCRIPTION OF THE INVENTION

Figure 1:
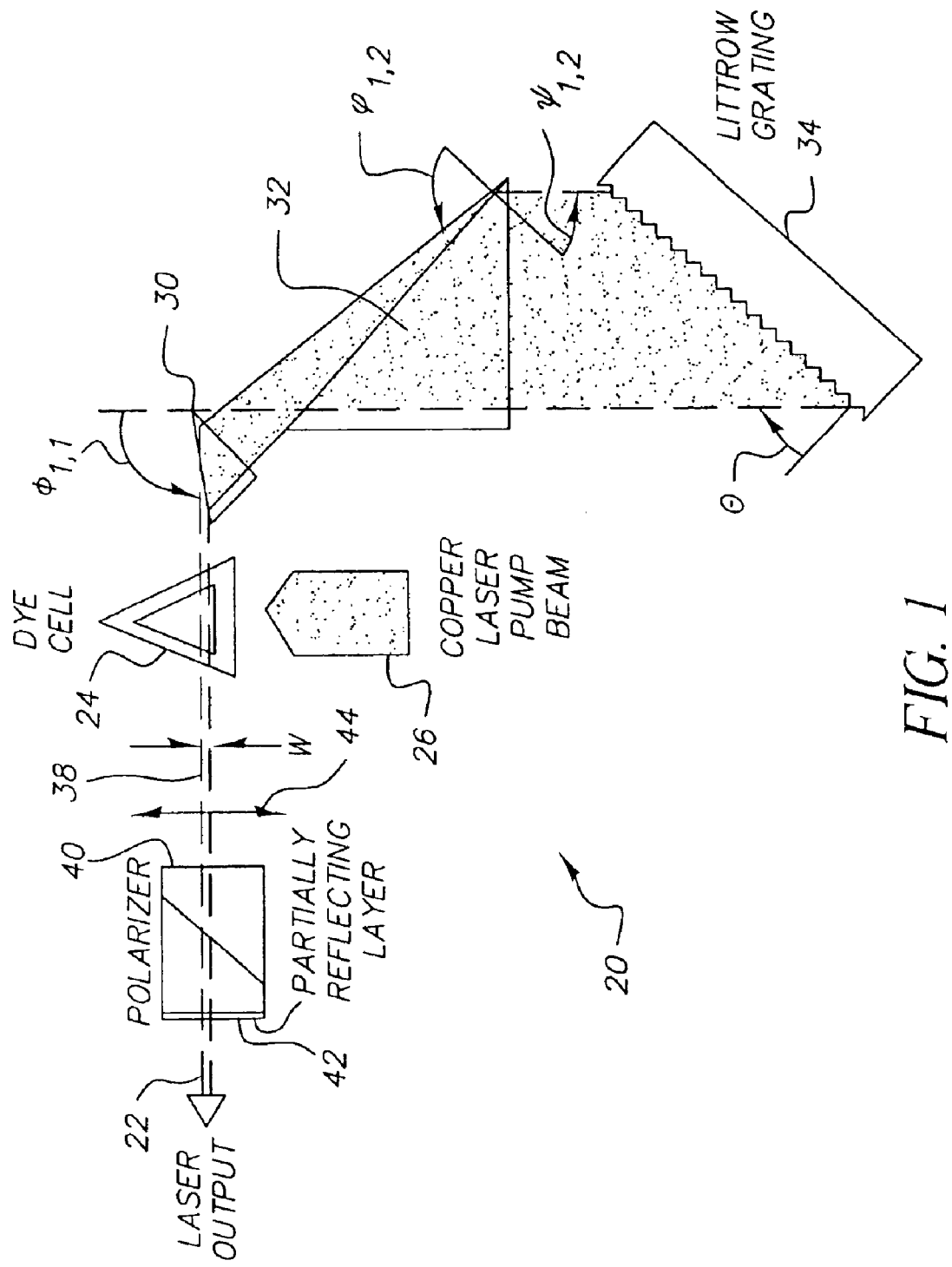
FIG. 1 shows a schematic diagram of a prior art dye laser apparatus using liquid gain media.

The following is a detailed description of the preferred embodiments of the invention, reference being made to the drawings in which the same reference numerals identify the same elements of structure in each of the several figures.

As indicated above, optical homogeneity is critical in a gain media. In addition, a low dn/dT value is essential to cool the gain media. By a low value, Applicant refers to the magnitude.

As indicated above, some polymer gain media material can be plagued by inhomogeneity problems. HEMA:MMA and MPMMA (modified polymethyl methacrylate) have been employed as a gain media, and these materials do provide optical homogeneity suitable for use in a tunable narrow-linewidth solid-state dye laser. However, HEMA:MMA and MPMMA have thermal disadvantages, as indicated above.

Figure 2:
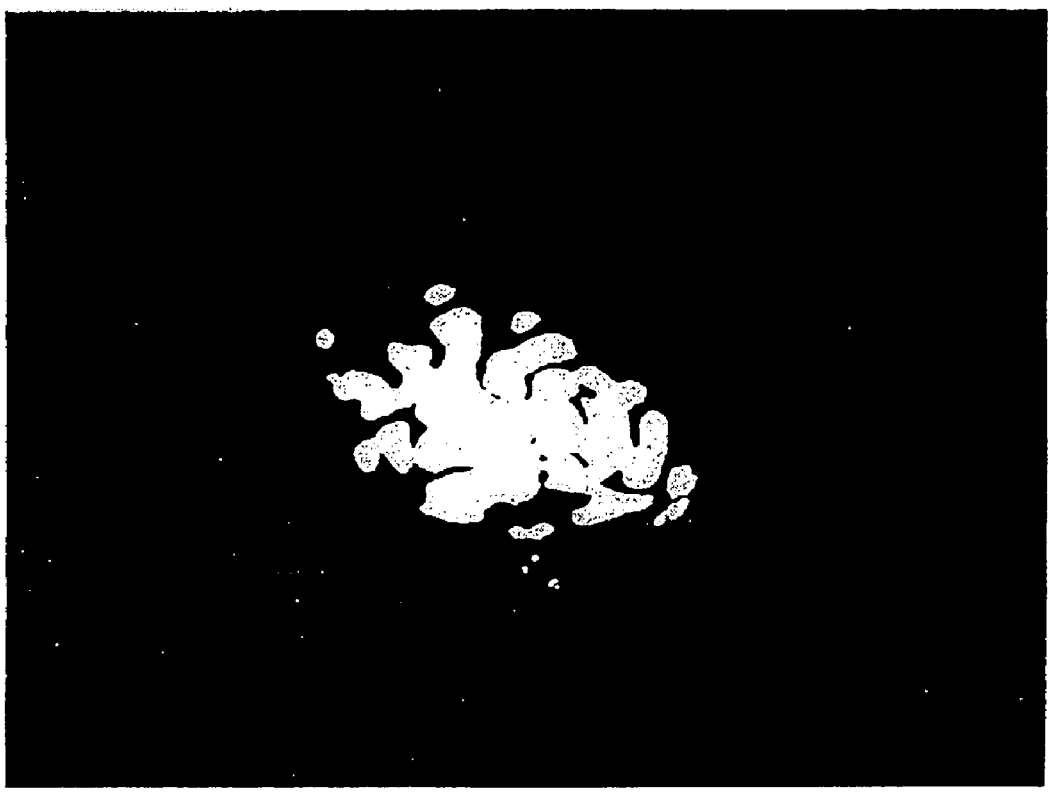
FIG. 2 shows a cross section of a laser beam transmission through a conventional silicate/PMMA nanocomposite exhibiting severe beam distortions.

In previous experiments (refer to Duarte et al, 1993), dye-doped silicate-polymer matrices, such as ORMOSIL, were investigated because they were believed to offer favorable dn/dT values relative to pure polymer matrices. For example, fused silica has a dn/dT value in the range of about $0.1 \times 10^{-4} (\text{degree-K})^{-1}$ while a polymeric matrix has a dn/dT value in the range of about $-1.04 \times 10^{-4} (\text{degree-K})^{-1}$. However, as disclosed in Duarte, OPTICAL INHOMOGENEITIES IN SOL-GEL DERIVED ORMOSILS AND NANOCOMPOSITES, in Sol-Gel Science and Technology, edited by Pope et al, The American Ceramic Society, Waterville, Ohio, 1995, pages 267–273, conventional silicate-polymer composite matrices suffer from a refractive index mismatch between the silicate structure and the polymer that promotes a break up of the laser beam, due to internal interference. More particularly, as shown in FIG. 2, a cross section of the beam following propagation through a silicate/PMMA nanocomposite exhibits severe beam distortions. Since the silicate/PMMA nanocomposites (as then known in the art) showed significant distortion, the optical homogeneity of MPMMA matrices showed significant advantage as compared to silicate type matrices. Accordingly, Applicant turned away from assessing further silicate type matrices as material for gain medium (refer to Duarte, 1994).

Figure 3:
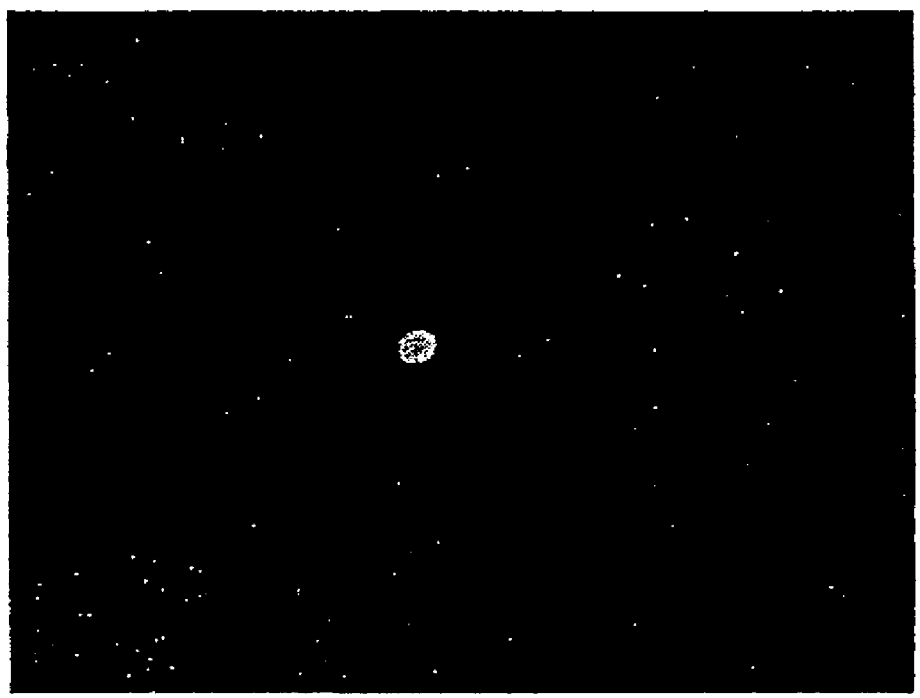
FIG. 3 shows a cross section of a laser beam transmission for a dye-doped polymer nanoparticle matrix, in accordance with the present invention.
Figure 4:
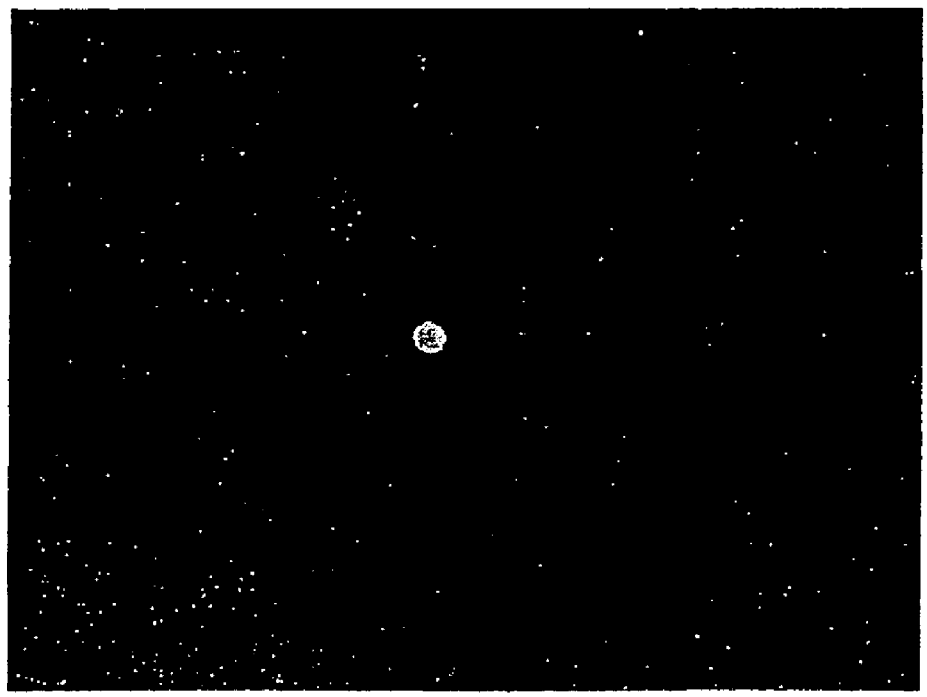
FIG. 4 shows a cross section of a laser beam transmission for a standard optically homogeneous dye-doped polymer matrix as used in a narrow-linewidth tunable laser oscillator.

In the present invention, Applicant combines silica nanoparticle technology and polymer synthesis to create a new class of dye-doped polymer-silica laser gain media. In one embodiment, Applicant has developed a dye-doped polymer-silica nanoparticle composite laser matrix that provides a distinctive TEM00 laser beam profile which exhibits laser beam propagation characteristics similar to pure polymer matrices. FIG. 3 shows a cross section of a laser beam transmission for a dye-doped polymer nanoparticle matrix, in accordance with the present invention, at about $\lambda=632.8$ nm. FIG. 4 shows a beam transmission for a standard optically homogeneous dye-doped polymer matrix as used in a narrow-linewidth tunable laser oscillator, showing a beam propagation characteristic similar to those exhibited in FIG. 3. From general observation, FIGS. 3 and 4 show nearly identical profiles. Thus, these figures demonstrate that the pure polymer and the new dye-doped polymer nanoparticle matrix as a gain medium in accordance with the present invention preserve the characteristics of the TEM00 beam following transmission.

Figure 5:
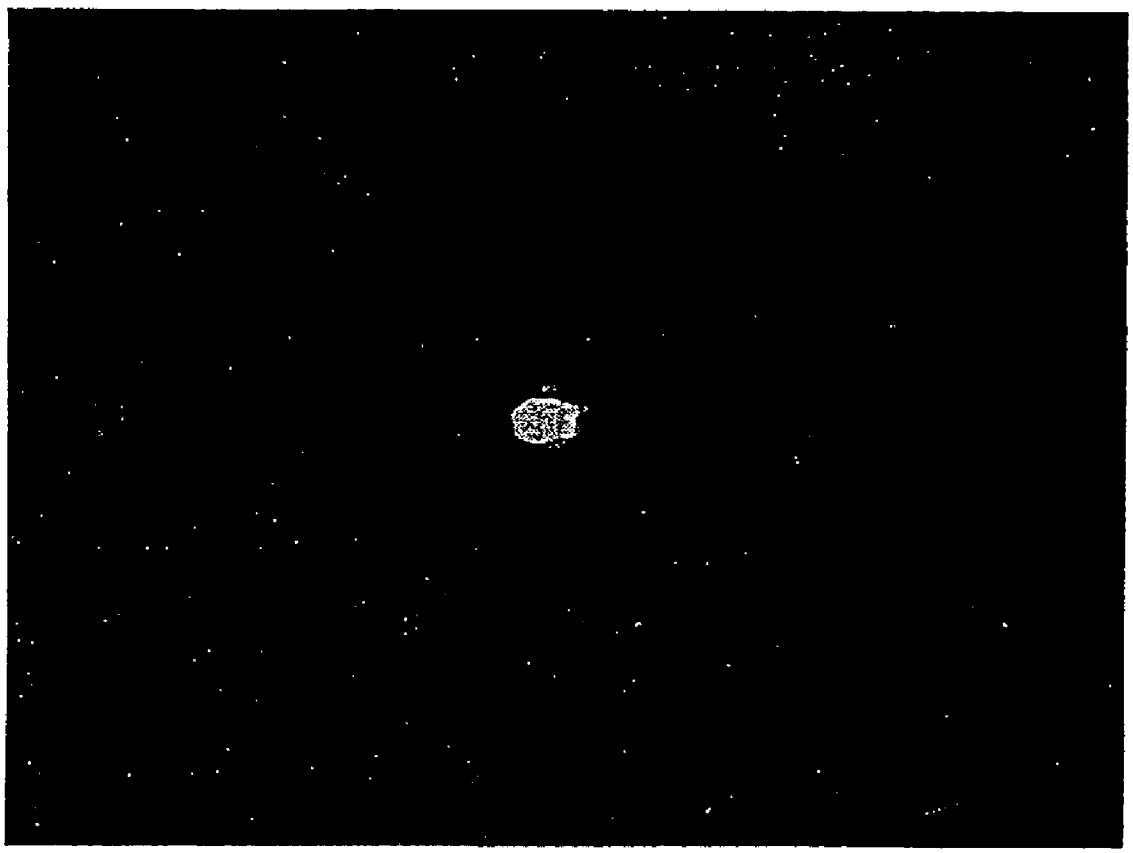
FIG. 5 shows a cross section of a laser beam emitted from a tunable laser using the dye-doped polymer-silica nanoparticle matrix of the present invention.
Figure 6:
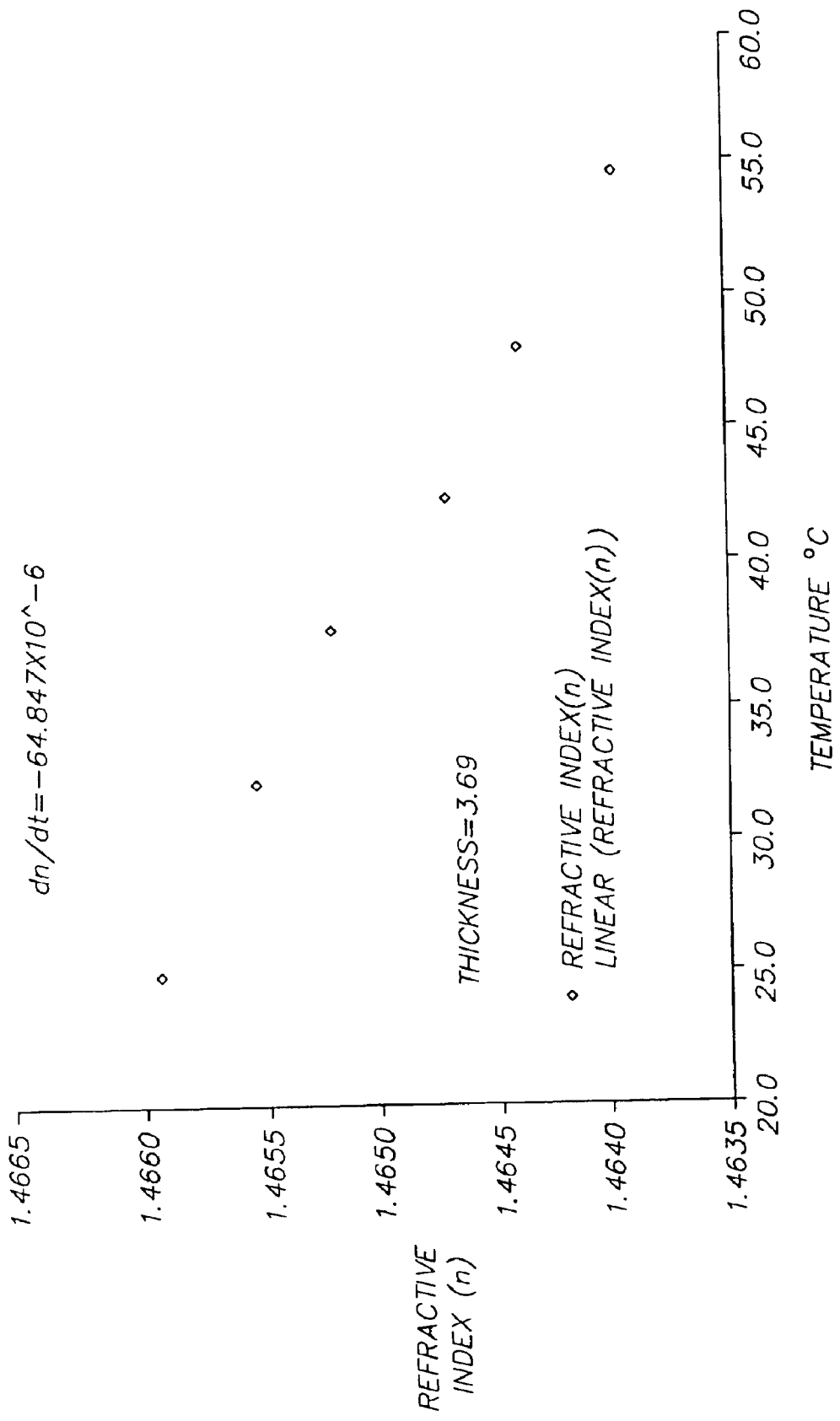
FIG. 6 shows the dn/dT value of the 50:50 PMMA-SiO2 composition of FIG. 5.

FIG. 5 shows the cross section of a near TEM00 laser, incorporating the new dye-doped polymer-silica nanoparticle gain medium. Laser emission is about $\lambda=580$ nm when excited longitudinally at about $\lambda=530$ nm. This particular matrix has a 50:50 w/w, PMMA-SiO2 nanoparticle composition and exhibits a dn/dT of about $-0.65 \times 10^{-4}$(degree-K)$^{-1}$. Refer to FIG. 6.

The present invention discloses a dye-doped polymer nanoparticle matrix suitable for use as a gain medium material. As such, the present invention discloses a laser having a gain medium producing a light emission, wherein the gain medium comprised of a dye-doped polymer nanoparticle matrix that enables the emission of single transverse mode laser beam.

In one embodiment, the nanoparticle comprises a silica particle. Silica particles having a small particle size are preferred. Therefore, preferably, the silica particles are less than 25 nanometers. Silica particles are often available commercially in a size from about 5 nm to about 12 nm, and such 5–12 nm size has been found to be suitable.

In one embodiment, the polymer comprises polymethyl methacrylate (PMMA). Preferably, the PMMA is of a high quality optical grade. As example of a suitable PMMA is PLEXIGLAS® VLD, such as commercially available from Atoglas. FIG. 7 shows a chart listing particular material properties of VLD available from Atoglas. Other material properties are available at http://www.atofinachemicals.com/atoglas/pl-vld.cfm or at the MatWeb database (an internet material property database at www.matweb.com). By high quality it is meant that the polymer would comprise minimal polymer slugs, minimal unwanted color, and a uniform refractive index.

In one embodiment, the dye comprises Rhodamine. An example of a suitable Rhodamine is Rhodamine 6G or Rhodamine 590. Rhodamine provides an orange color to the gain medium, which lasers in the yellow to red portion of the spectrum, and is magenta in transmission.

Figure 8:
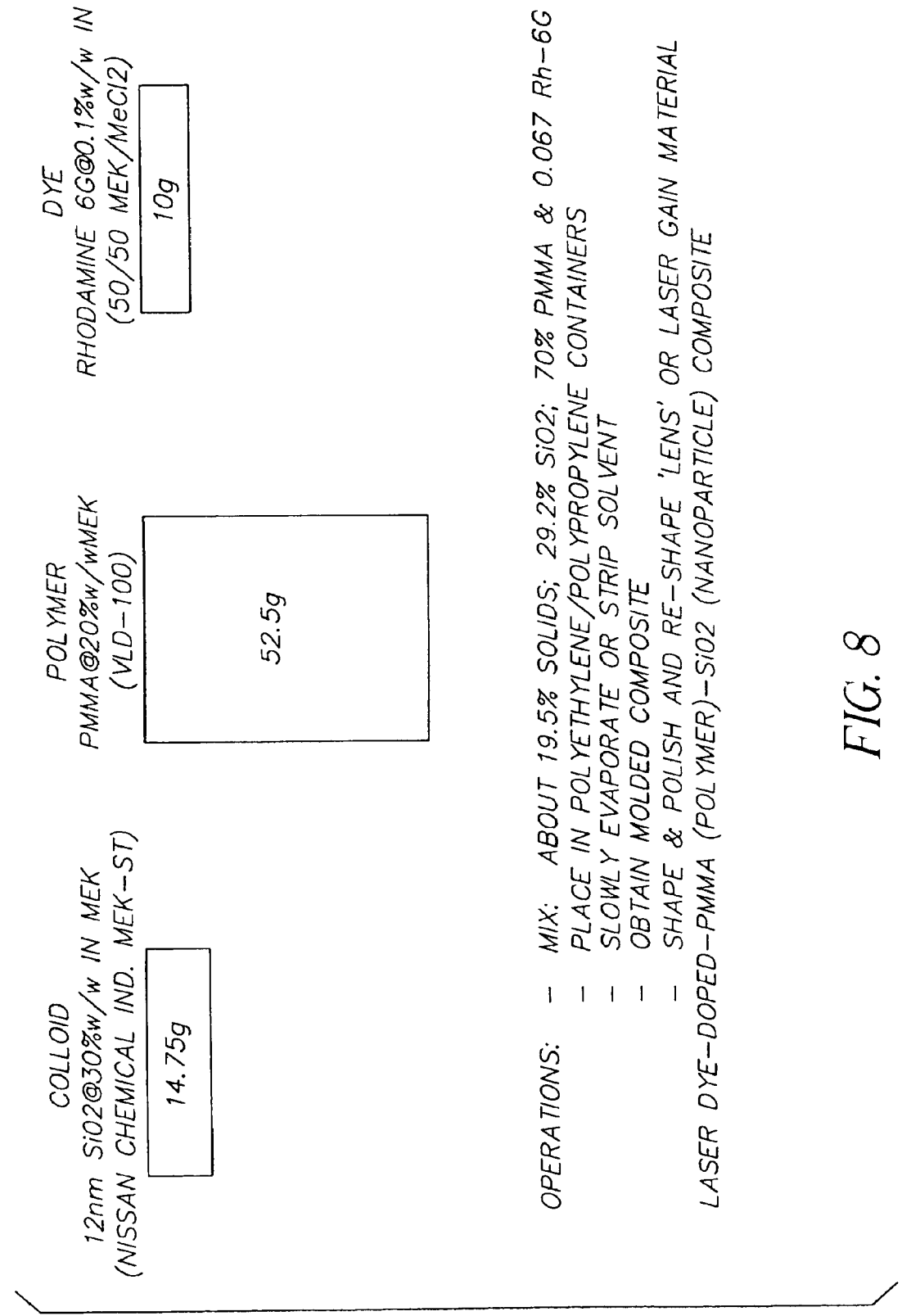
FIG. 8 shows a method in accordance with the present invention for fabricating the dye-doped polymer nanoparticle matrix of FIG. 3.

FIG. 8 shows a method of fabrication, in accordance with the present invention, to uniformly distribute silica particles throughout the medium allowing the attainment of an optically homogeneous gain medium. As shown in FIG. 8, the nanoparticle comprises 14.75 grams of 12 nm silica (SiO2) at 30 percent by weight in MEK (methyl ethyl ketone), specifically, Nissan Chemical Ind. MEK-ST. The polymer comprises 52.5 grams of PMMA at 20 percent by weight in MEK, wherein the PMMA is VLD. The dye comprises 10 grams Rhodamine 6G at 0.1 percent by weight in solution, wherein the solution is 50/50 MEK/MeCl2. The nanoparticle, polymer, and dye were mixed, with the mixture being 19.5 percent total solids; and 29.2 percent silica (SiO2), 70 percent PMMA, and about 0.067 percent Rhodamine 6G as dry solids.

The mixture was then placed in a polyethylene or polypropylene container. The mixture was allowed to slowly evaporate, wherein the solvent was stripped from the mixture to obtain a molded composite. The molded composite can then be shaped and polished to form gain media 24.

Figure 9:
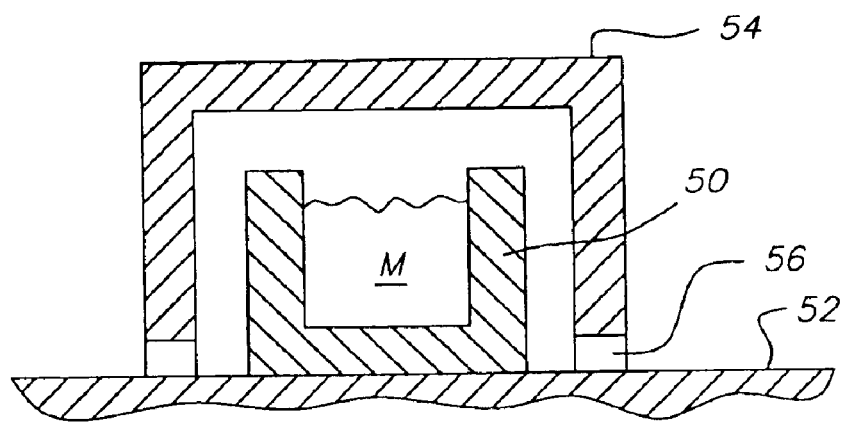
FIG. 9 shows a cross-sectional view of one arrangement for a slow evaporation process.

The mixture is preferably evaporated in a saturated environment to control the evaporation process. FIG. 9 shows an arrangement of a saturated environment for the slow evaporation process. Container 50 comprises the mixture M, and is disposed on a support 52. A cover 54 is placed over container 50 to form an enclosure, but cover 54 is spaced from support 52 such that a gap/opening 56 is formed for air to be in communication with the enclosure.

The arrangement can be disposed in a controlled environment. For example, the arrangement can be disposed in a 23 degree C. chamber/room. A hood can be employed to remove the solvent from the controlled environment. The evaporation process can have a duration of 3 weeks, depending on the sample size.

Figure 10:
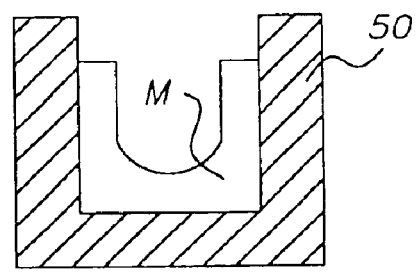
FIG. 10 shows a cross-sectional view of the container and mixture of FIG. 8 after the evaporation process.
Figure 11:
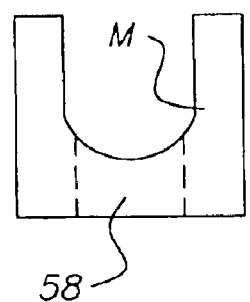
FIG. 11 shows a cross-sectional view of the mixture of FIG. 10 identifying the portion of reduced stress.

As the solvent is stripped from the mixture M, the mixture M solidifies and forms a concave shape, as best shown in FIGS. 9, 10 and 11. Applicant has recognized that areas of stress are induced in the mixture as the mixture solidifies. That is, that the concave-shaped solidified mixture M includes areas of high, moderate, and reduced stress. For Applicant's particular application, a minimally stressed material is preferred. Applicant has recognized a portion 58 of the concave-shaped solidified mixture M, shown in FIG. 11, is an area having the minimal stress. Therefore, portion 58 is shaped to form gain media 24.

Forming and shaping material for gain media 24 is well known to those skilled in the art, so it is not discussed. Shapes for suitable gain media are disclosed in a paper by Duarte titled HIGH POWER DYE LASER, F. J. Duarte, Ed. (Springer-Verlag, Berlin, 1991), pp. 7–43, incorporated herein by reference. Of particular interest are shapes of trapezoidal geometry.

Figure 15:
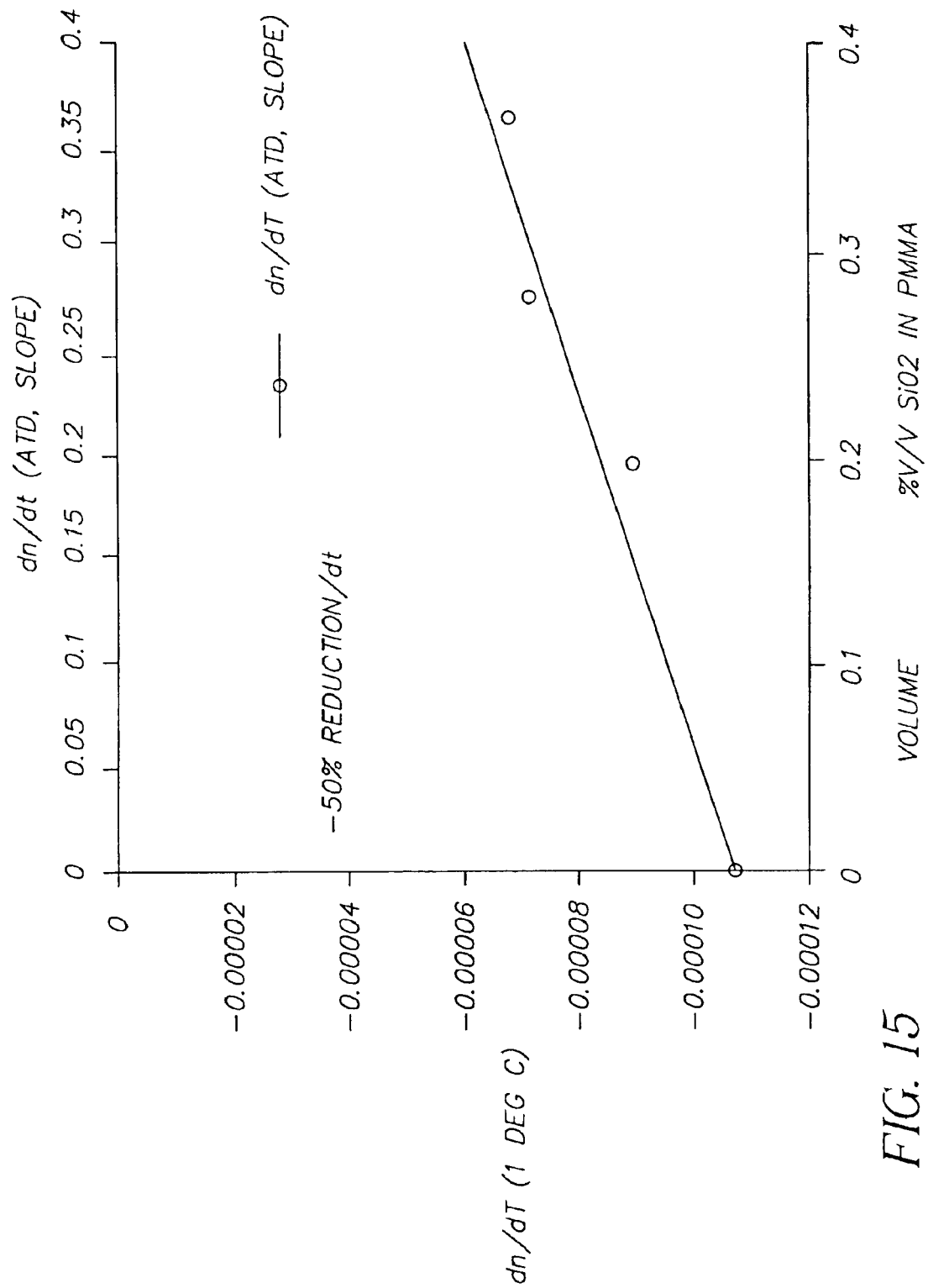
FIG. 15 shows a chart diagramming the percent volume of silica/PMMA versus dn/dT for the compositions of FIGS. 12–14.
Figure 16:
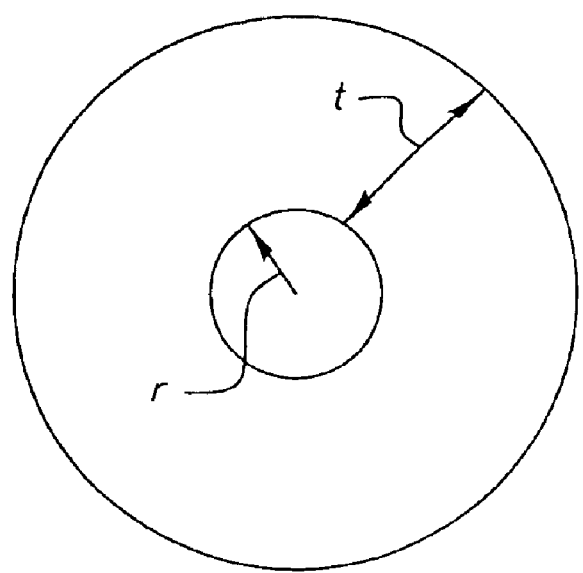
FIG. 16 shows a model of a core-shell composite nanoparticle.
Figure 17:
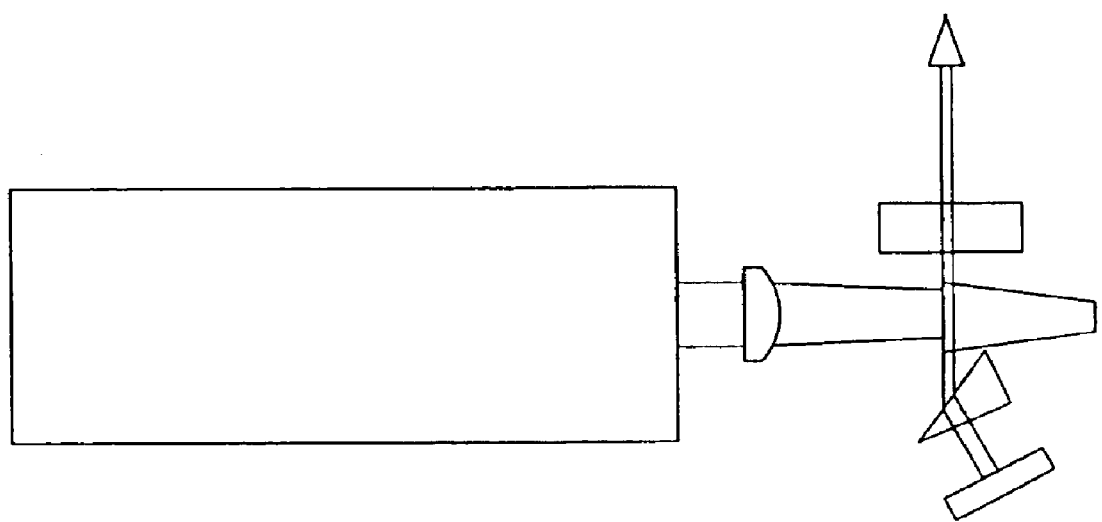
FIG. 17 shows a first optical configuration for employing the gain medium of the present invention.
Figure 18:
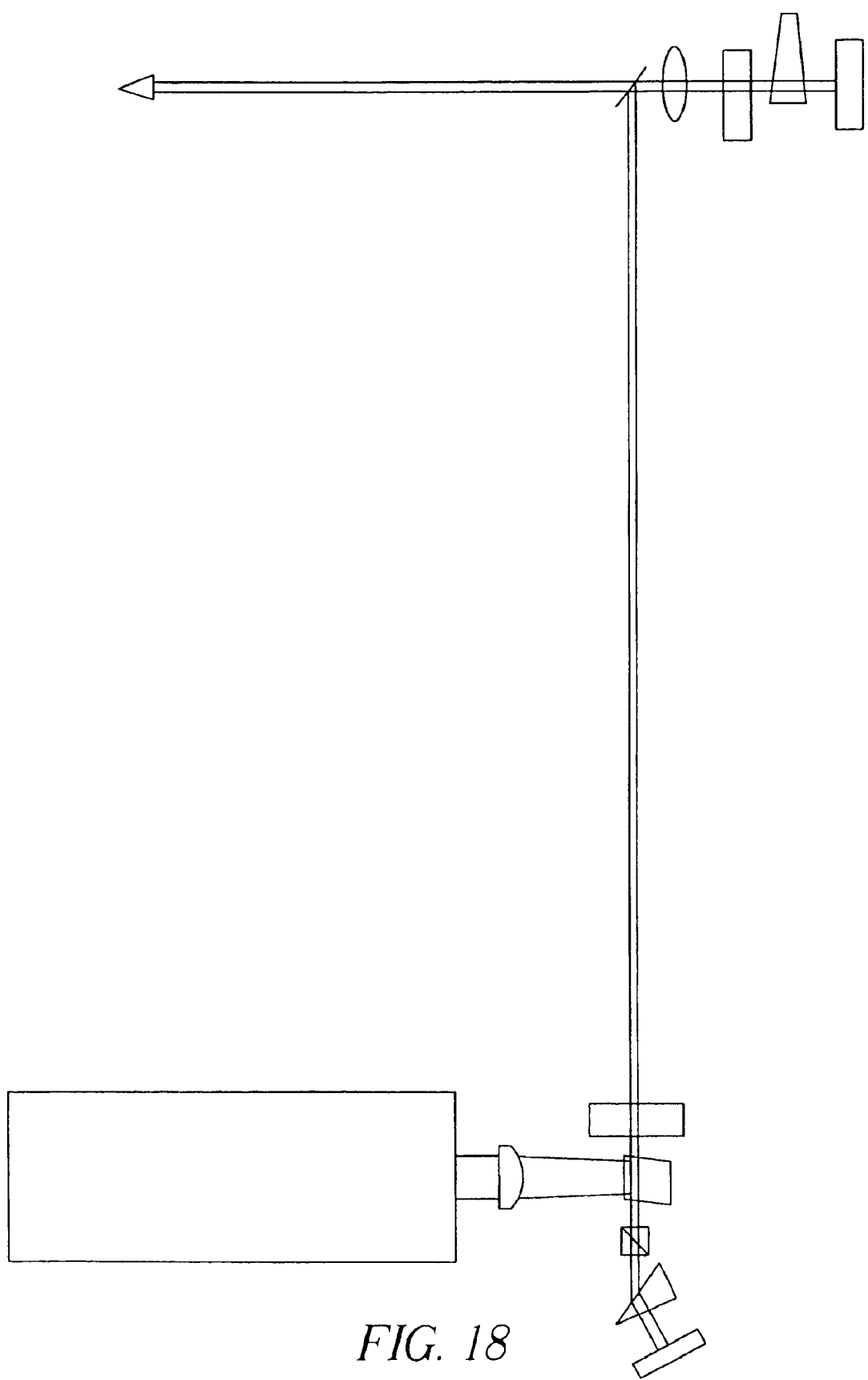
FIG. 18 shows a second optical configuration for employing the gain medium of the present invention.

Applicant developed a series of three dye-doped polymer nanoparticle matrix comprising from about 30 w/w percent silica particles to about 50 w/w percent silica particles. The particular elements of the three matrices are shown in FIGS. 12, 13, and 14, wherein the nanoparticle is silica, the polymer is PMMA, and the dye is Rhodamine 6G. FIG. 15 provides a chart diagramming the percent volume of silica nanoparticles dispersed in PMMA composite matrix versus dn/dT for the three matrices. The figure shows the linear dependence of dn/dT with volume fraction of silica particles dispersed in the composite material.

Of these three matrices, it appears that the Rhodamine 6G dye-doped PMMA-SiO2 nanoparticle (50/50 w/w) matrix provides particularly desirable characteristics. More particularly, the higher SiO2 provides the lowest dn/dT, approximately $-0.65 \times 10^{-4}$ (degree-K)$^{-1}$.

Other dyes may be employed which have a color that covers the light spectrum. For example, a blue dye can be employed or a green dye. Examples of particular dyes include Coumarin 500 and Coumarin 314T and other members of the Coumarin family of laser dyes.

Other nanoparticles can be employed. As indicated above, materials having a high positive dn/dT are preferred, such as zinc sulfide and magnesium oxide. U.S. Pat. No. 6,441,077 (Border), commonly assigned and incorporated herein by reference, lists the dn/dT values of a plurality of materials.

Of these materials, the following have a high positive dn/dT values and so could be suitable: aluminum oxide, calcium carbonate, magnesium oxide, and zinc sulfide.

When employing these nanoparticles, it is critical that the nanoparticle is optically invisible. This can be accomplished by the nanoparticle having a core-shell composite nanoparticle arrangement, as shown in FIG. 14. Core-shell arrangements are known, for example, U.S. Pat. No. 5,985,173 (Gray) discloses a phosphor having a composite core surrounded by a shell material.

For a zinc sulfide (ZnS) core and SiO2 shell in PMMA, it is preferred that the thickness t of the shell be approximately equal to half the radius r of the core. That is:

$$t \cong 0.5r$$

Though in some arrangements, thickness t can be equal to radius r. That is:

$$t \cong r$$

The maximum thickness t should preferably be no greater than 1.5 times radius r. That is:

$$t_{max} < 1.5r$$

because at this thickness, the volume of the shell is more than 10 times that of the core and the shell effectively dilutes the high positive value of dn/dT of the core.

To promote optical invisibility, the core preferably has a radius r of less than 100 nm. It is preferred that the core's radius be less than 40 nm, preferably 5–10 nm. The shell preferably has a thickness t of less than 20 nm, preferably 7–15 nm. The shell comprises a low RI material where:

$$RI_{shell} < RI_{polymer}$$

whereas the core comprises a high RI material.

Other polymers can be employed. For example, polyolefin and polycarbonate. Border discloses further polymers that can be employed.

The gain media of the present invention can be employed in lasers of various configurations known to those skilled in the art. That is, the gain media of the present invention is not limited to linear lasers. Other configurations are well known, including but not limited to, an unstable resonator configuration, an oscillator configuration, and a ring cavity configuration.

Optical pumping can be accomplished using well known ultra violet nitrogen lasers and flash lamps. (Refer to the reference DYE LASER PRINCIPLES, by Duarte and Hillman (Eds.), Academic, New York, 1990.) In addition, high brightness blue diodes can be employed. Optical pumping can also be accomplished using visible lasers, particularly for Rhodamine doped material. Lasers such as a TEM00 dye laser, frequency doubled Nd:YAG laser, copper vapor laser, and blue diode lasers can be employed.

Examples of excitation sources include a N2 laser (λ of 337 nm), N2-pumped dye lasers in the visible spectrum, Cu lasers (λ of 510.5 nm), and Nd:YAG (doubled) lasers (λ of 532 nm). In addition, non-laser excitation sources, such as broadband flashlamp-pumping and high-brightness blue diodes can be used.

As will be recognized by those skilled in the art, the gain medium of the present invention can be employed with various optical configurations including, but not limited to, transverse excitation using a N2 laser (refer to FIG. 17) with a gain medium of Rh6G-doped polymer-SiO2 nanoparticle composite or Coumarin 500-doped polymer-SiO2 nanoparticle composite. The solid state dye laser gain medium can be excited using a liquid dye laser gain medium in the cavity of Duarte (refer to FIG. 18).

Referring now to FIG. 19, there is shown the performance of solid-state lasers incorporating dye-doped polymers (DDP) and dye-doped polymer nanoparticles (DDPN) indicating reduced laser beam divergence. More particularly, Applicants have recognized that increasing the Si-nanoparticle content, which results in a reduced dn/dT, has the affect of lowering the laser beam divergence. That is, lower the absolute value of dn/dT lower laser beam divergence.

As discussed above, the dye-doped polymer nanoparticle (DDPN) matrix is a matrix comprising dye-doped polymers and nanoparticles, preferably silica particles. In the present invention, in a preferred embodiment, the gain medium comprising the dye-doped polymer nanoparticle matrix has an absolute value of dn/dT less than an absolute value of dn/dT of its dye-doped polymer matrix.

Stated alternatively, the dye-doped polymer nanoparticle (DDPN) matrix is a matrix comprised of the pure dye-doped polymer and nanoparticles. Each has a value of dn/dT (i.e., $dn/dT_{DDPNmatrix}$, $dn/dT_{puredye\text{-}doped\ polymer}$, and $dn/dT_{nanoparticles}$) wherein, in a preferred embodiment:

$$ABS(dn/dT_{DDPNmatrix}) < ABS(dn/dT_{puredye\text{-}doped\ polymer}).$$

In a preferred embodiment, the absolute value of dn/dT for the DDPN is less than the absolute value of dn/dT of the corresponding DDP. For example, for a preferred embodiment, the absolute value of dn/dT of a dye-doped polymer Si-nanoparticle (i.e., DDPN) is less than the absolute value of dn/dT of a pure laser dye-doped polymer, such as Rhodamine 6G doped PMMA (i.e., DDP). This is shown in FIG. 20. (PN refers to polymer-nanoparticle.)

In a further preferred embodiment, the absolute value of dn/dT of the DDPN is in the range of $0.64–0.88 \times 10^{-4}$.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

20 apparatus
22 beam
24 dye cell/gain medium
26 beam
30 first prism
32 second prims
34 grating
38 polarized beam
40 polarizer device
42 coating
50 container
52 support
54 cover
56 gap/opening
58 portion

What is claimed is:

1. A gain medium for producing a light emission in a laser, the gain medium comprising a dye-doped polymer nanoparticle matrix comprised of dye-doped polymers and nanoparticles, the dye-doped polymer nanoparticle matrix having an absolute value of dn/dT less than an absolute value of dn/dT of the pure dye-doped polymer matrix.

2. The gain medium of claim 1, wherein the nanoparticles comprises a silica particle.

3. The gain medium of claim 2, wherein the silica particles are less than 25 nanometers.

4. The gain medium of claim 2, wherein the silica particles are between about 5 and about 12 nanometers.

5. The gain medium of claim 1, wherein the polymer comprises a polymethyl methacrylate (PMMA).

6. The gain medium of claim 5, wherein the PMMA is a high quality optical grade PMMA.

7. The gain medium of claim 1, wherein the dye comprises Rhodamine.

8. The gain medium of claim 7, wherein the dye comprises Rhodamine 6G.

9. The gain medium of claim 1, wherein the absolute value of dn/dT of the dye-doped polymer nanoparticle matrix is in the range of about $0.64 \times 10^{-4}$ to about $0.88 \times 10^{-4}$.

10. A gain medium, the gain medium comprising a dye-doped polymer nanoparticle matrix comprised of dye-doped polymers and nanoparticles, the dye-doped polymer nanoparticle matrix having an absolute value of dn/dT less than an absolute value of dn/dT of its dye-doped polymer matrix.

11. A laser having a gain medium producing a light emission, the gain medium comprising a dye-doped polymer nanoparticle matrix that enables the emission of single transverse mode laser beam, and the gain medium comprising a dye-doped polymer nanoparticle matrix having an absolute value of dn/dT less than an absolute value of dn/dT of its dye-doped polymer matrix.

12. The laser of claim 11, wherein the dye-doped polymer nanoparticle matrix is a Rhodamine-doped PMMA-silica matrix.

* * * * *